(12) United States Patent
Ma

(10) Patent No.: US 10,564,342 B2
(45) Date of Patent: Feb. 18, 2020

(54) LIGHT DIVERGING STRUCTURE, BACKLIGHT MODULE AND DISPLAY DEVICE

(71) Applicant: BOE TECHNOLOGY GROUP CO., LTD., Beijing (CN)

(72) Inventor: Ruoyu Ma, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/738,575

(22) PCT Filed: May 16, 2017

(86) PCT No.: PCT/CN2017/084574
§ 371 (c)(1),
(2) Date: Dec. 20, 2017

(87) PCT Pub. No.: WO2017/198151
PCT Pub. Date: Nov. 23, 2017

(65) Prior Publication Data
US 2018/0188435 A1 Jul. 5, 2018

(30) Foreign Application Priority Data
May 17, 2016 (CN) .......................... 2016 1 0326835

(51) Int. Cl.
F21V 8/00 (2006.01)
(52) U.S. Cl.
CPC ......... *G02B 6/0023* (2013.01); *G02B 6/0068* (2013.01)
(58) Field of Classification Search
CPC .. G02B 6/0023; G02B 5/0231; G02B 5/0278; G02B 6/0068
(Continued)

(56) References Cited

U.S. PATENT DOCUMENTS

2006/0077692 A1* 4/2006 Noh ....................... G02B 6/003
362/625
2007/0121227 A1 5/2007 Wang et al.
(Continued)

FOREIGN PATENT DOCUMENTS

CN 1296604 A 5/2001
CN 101641619 A 2/2010
(Continued)

OTHER PUBLICATIONS

First Chinese Office Action, for Chinese Patent Application No. 201610326835.5, dated Oct. 20, 2017, 20 pages.
(Continued)

*Primary Examiner* — Anh T Mai
*Assistant Examiner* — Jessica M Apenteng
(74) *Attorney, Agent, or Firm* — Kinney & Lange, P.A.

(57) ABSTRACT

A light diverging structure, a backlight module and a display device are provided. The light diverging structure includes a substrate and multiple light diverging units arranged on the substrate and spaced from each other. The multiple light diverging units are used to diverge an incident light into at least two beams of emergent light propagated in different directions, the at least two beams of emergent light propagated in the different directions form a light band having a preset curvature. The backlight module includes multiple light sources, a light guide plate and the light diverging structure. The light diverging structure is arranged between a light-entering face of the light guide plate and the multiple light sources.

18 Claims, 3 Drawing Sheets

(58) Field of Classification Search
USPC .................................................. 362/600–634
See application file for complete search history.

(56) References Cited

U.S. PATENT DOCUMENTS

| | | | | |
|---|---|---|---|---|
| 2008/0297908 | A1* | 12/2008 | Adachi | G02B 3/0056 |
| | | | | 359/599 |
| 2009/0168441 | A1* | 7/2009 | Lin | G02B 6/0081 |
| | | | | 362/487 |
| 2010/0053497 | A1* | 3/2010 | Nagata | G02B 3/005 |
| | | | | 349/61 |
| 2012/0300493 | A1 | 11/2012 | Chang et al. | |
| 2015/0373828 | A1 | 12/2015 | Ye et al. | |

FOREIGN PATENT DOCUMENTS

| | | |
|---|---|---|
| CN | 102262262 A | 11/2011 |
| CN | 102287679 A | 12/2011 |
| CN | 104633507 A | 5/2015 |
| CN | 105759328 A | 7/2016 |
| CN | 205594189 U | 9/2016 |

OTHER PUBLICATIONS

English Translation of International Search Report & Written Opinion, for PCT Patent Application No. PCT/CN2017/084574, dated Jul. 27, 2017, 17 pages.

\* cited by examiner

LIGHT DIVERGING STRUCTURE, BACKLIGHT MODULE AND DISPLAY DEVICE

CROSS-REFERENCE TO RELATED APPLICATIONS

The present application is a national phase of PCT Application No. PCT/CN2017/084574 filed on May 16, 2017, which claims a priority to Chinese Patent Application No. 201610326835.5 filed on May 17, 2016, the disclosure of which are incorporated in their entireties by reference herein.

TECHNICAL FIELD

The present disclosure relates to display technologies, and more particularly, to a light diverging structure, a backlight module and a display device.

BACKGROUND

The backlight module is an important component for a display device and light-outgoing performance of the backlight module may directly affect display effect of the display device.

The collimated light such as laser can be applied to the backlight module of the display device for enhancing the display effect of the display device, e.g., enhancing color gamut. The laser has high directionality and high color purity, so the range of the color gamut of the display device can be greatly enlarged by applying the laser to the backlight for a liquid crystal screen. Current laser display can have more than 120% national television standards committee (NTSC) color gamut and good color expression. In a backlight module in related technology, multiple independent light sources are arranged at one side of a light guide plate and the light sources are spaced from each other. In the case that each light source is a collimated light source emitting the laser and the laser is not subjected to light-mixing, light entering the light guide plate of the backlight module is not uniform and the display effect may be affected. In addition, due to directionality and complexity in light mixing of the laser, a light-mixing device for laser is complicated and thus the backlight is heavy and expensive.

SUMMARY

Embodiments of the present disclosure provide a light diverging structure, a backlight module and a display device.

In one aspect, the present disclosure provides in some embodiments a light diverging structure, including a substrate and multiple light diverging units arranged on the substrate and spaced from each other. The multiple light diverging units are used to diverge an incident light into at least two beams of emergent light propagated in different directions. The at least two beams of emergent light propagated in the different directions form a light band having a preset curvature.

Optionally, each light diverging unit includes at least one bump.

Optionally, each light diverging unit is one strip-like bump or a strip-like bump formed by multiple bump units connected to each other.

Optionally, for a longitudinal section of each light diverging unit perpendicular to the substrate, one end of the longitudinal section close to the substrate is wider than another end of the longitudinal section far away from the substrate.

Optionally, the longitudinal section is a trapezoid, a triangle, a semicircle or an arch, and the substrate is in shape of a plate.

Optionally, a distance between adjacent light diverging units ranges from 10 um to 100 um.

Optionally, the substrate is made of a first transparent optical medium material and the light diverging units are made of a second transparent optical medium material.

Optionally, the first transparent optical medium material includes a transparent resin or a transparent glass and the second transparent optical medium material includes a transparent resin or a transparent glass.

Optionally, at least one of the first transparent optical medium material and the second transparent optical medium material includes Polyethylene Terephthalate.

Optionally, the incident light may be a collimated light.

In another aspect, the present disclosure provides in some embodiments a backlight module, including multiple light sources, a light guide plate and the light diverging structure according to any embodiment of the present disclosure. The light diverging structure is arranged between a light-entering face of the light guide plate and the multiple light sources. The multiple light diverging units are arranged at a side of the substrate of the light diverging structure, the side being close to the light guide plate.

Optionally, the multiple light sources are arranged corresponding to the multiple light diverging units in a one-to-one correspondence.

Optionally, an incident angle of a light emitted by each light source with respect to the substrate of the light diverging structure is adjustable.

Optionally, the substrate is a rectangle plate, each of two short sides of the substrate of the light diverging structure is connected to at least one laminated micrometric displacement element, and each laminated micrometric displacement element extends or shrinks under effect of an electric field to adjust the incident angle of the light emitted by each light source with respect to the substrate.

Optionally, each light source is a collimated light source.

Optionally, the collimated light source is a laser diode rod.

Optionally, the laser diode rod may include a laser diode rod that emits a light having a wavelength ranging from 570 nm to 650 nm, a laser diode rod that emits a light having a wavelength ranging from 480 nm to 540 nm, and a laser diode rod that emits a light having a wavelength ranging from 340 nm to 440 nm.

In still another aspect, the present disclosure provides in some embodiments a display device, including the backlight module according to any embodiment of the present disclosure.

DETAILED DESCRIPTION

For clarifying technical solutions and advantages of the present disclosure, detailed descriptions are given hereinafter based on embodiments in conjunction with drawings.

Figure 1A:
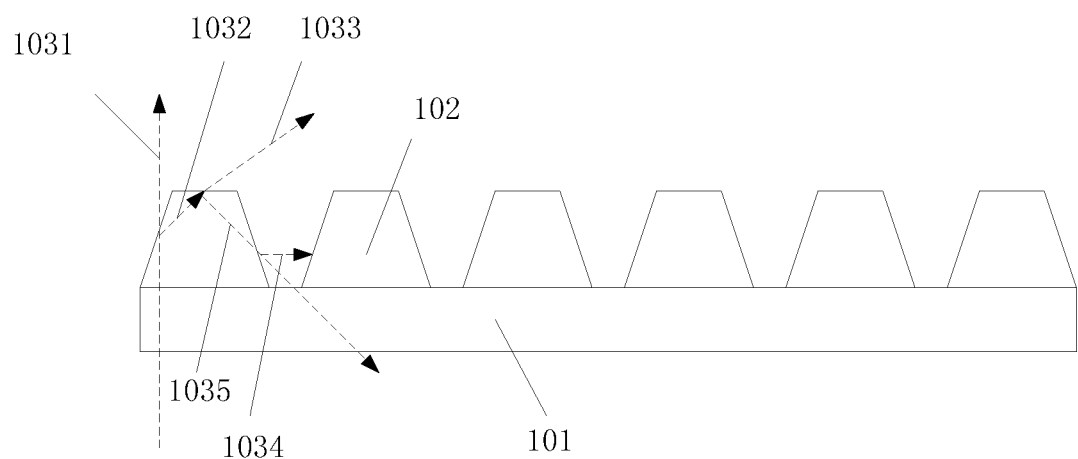
FIG. 1A is a schematic structural diagram of a light diverging structure according to some embodiments of the present disclosure.
Figure 1B:
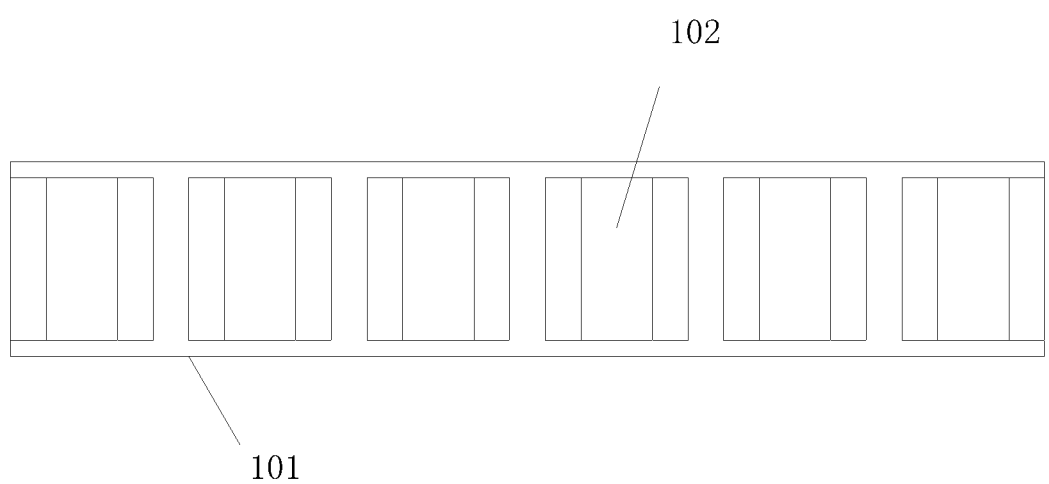
FIG. 1B is a schematic structural diagram of the light diverging structure according to some embodiments of the present disclosure observed in another direction.

First, the present disclosure provides a light diverging structure. As shown in FIGS. 1A-1B, the light diverging structure includes a substrate 101 and multiple light diverging units 102 that are arranged on the substrate 101 and spaced from each other. The multiple light diverging units 102 are used to diverge an incident light into at least two beams of emergent light propagated in different directions. The at least two beams of emergent light propagated in different directions may form a light band having a preset curvature.

With reference to dash lines shown in FIG. 1A, a part of an incident light is transmitted out of the light diverging unit, thereby generating a beam of light 1031, while another part of the incident light is reflected at an inner surface of a light diverging unit 102, thereby generating a beam of light 1032. The beam of light 1032 is refracted and reflected at the inner surface of the light diverging unit 102, thereby generating a beam of transmitted light 1033 and a beam of reflected light 1035. A part of the beam of reflected light 1035 is transmitted through the current light diverging unit 102 transversely, generated into a beam of light 1034, and then the beam of light 1034 enters an adjacent light diverging unit 102. Another part of the beam of reflected light 1035 is emitted out through the substrate 101. It is noted that in FIG. 1A, beams of light are not propagated exactly along the shown light paths and each segment of a shown light path may indicate multiple beams of light propagated approximately along a direction of the segment. Taking the beam of light 1035 for example, it may indicate multiple beams of light propagated in directions substantially identical to a direction of the beam of light 1035 shown in FIG. 1A, and a part of the multiple beams of light may be transmitted out of the current light diverging unit transversely and another part of the multiple beams of light may be emitted out through the substrate 101. In the case that an incident light enters the substrate 101 at a certain incident angle, light emitted out of the multiple light diverging units 102 may form a light band having a certain curvature at a light-outgoing side of the light diverging structure. When observing a top view of the substrate 101, a shape of the light band is shown by a dashed line in FIG. 1D. When applying the light diverging structure into a backlight module of a curved display, the curvature of the light band generated by the light diverging structure may correspond to a curvature of a light guide plate such that light from a light source can completely and uniformly enter the light guide plate, simplifying light-mixing and improving light-outgoing performance of the light guide plate.

In view of the above, with the light diverging structure provided in the present disclosure, the incident light can be diverged into two beams of emergent light propagated in different directions. Light emitted by each light source is diverged and then enters a region between adjacent light sources, and consequently, emergent light from multiple light sources that are spaced from each other can be more uniform; in the case that the light diverging structure is arranged between the multiple light sources and the light guide plate, light-outgoing performance of the backlight module and display effect of the display can be improved. The at least two beams of emergent light propagated in different directions are used to form a light band having a preset curvature. The curvature of the light band varies with an incident angle of the incident light with respect to the substrate of the light diverging structure. The curvature of the formed light band can be adjusted by adjusting the incident angle of the incident light with respect to the substrate of the light diverging structure, such that the light diverging structure provided in the present disclosure can be applied to a curved display device and the light band can provide the curved display device with uniform light in accordance with the curvature of the curved display device.

According to some embodiments of the present disclosure, each light diverging unit includes at least one bump.

According to some embodiments of the present disclosure, the light diverging structure can diverge an incident light into three or more beams of emergent light propagated in different directions.

According to some other embodiments, the light diverging unit can be embodied as any optical element that can diverge the incident light into at least two beams of emergent light propagated in different directions. For example, the light diverging unit may be a transparent optical element provided with a light guide structure therein, which can diverge a light to at least two different directions.

Optionally, the light diverging units are spaced from each other on the substrate. Optionally, distances between adjacent light diverging units are in accordance with preset distances between adjacent light sources.

Figure 1C:
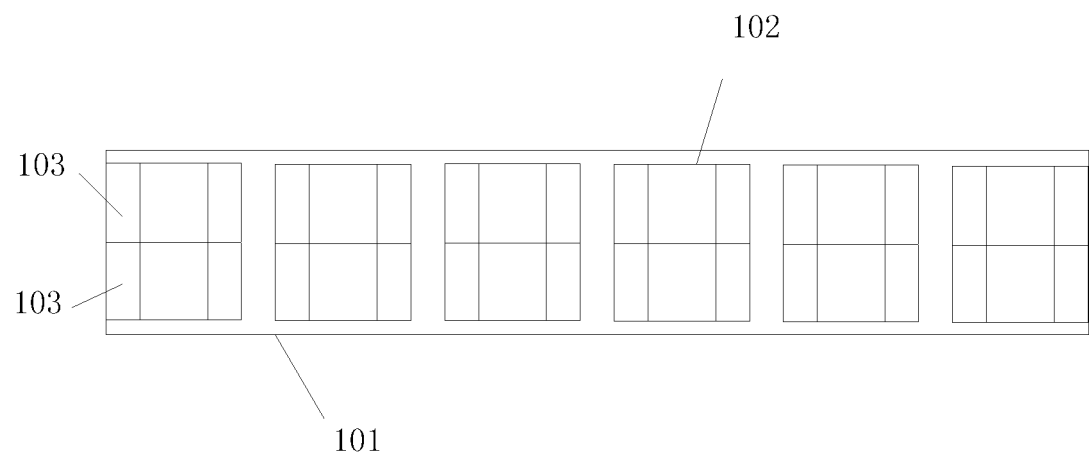
FIG. 1C is a schematic structural diagram of a light diverging structure according to some embodiments of the present disclosure.
Figure 1D:
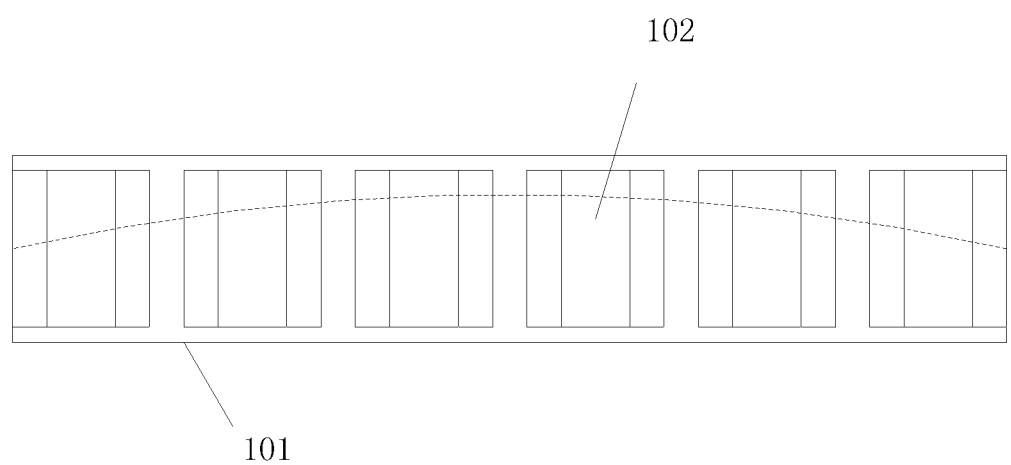
FIG. 1D schematically shows a light diverging structure according to some embodiments of the present disclosure and an emergent light band from the light diverging structure.

According to some embodiments of the present disclosure, as shown in FIG. 1B, each light diverging unit is one strip-like bump; or as shown in FIG. 1C, each light diverging unit is a strip-like bump formed by two or more bump units 103 connected to each other.

According to some embodiments of the present disclosure, for a longitudinal section of the light diverging unit perpendicular to the substrate, one end of the section close to the substrate is wider than another end of the section far away from the substrate.

Optionally, the longitudinal section is in parallel with a lengthwise direction of the substrate, and the light diverging unit having the above described longitudinal section can diverge a light into at least two beams of light.

According to some embodiments of the present disclosure, the longitudinal section may be a trapezoid, a triangle, a semicircle or an arch, and the substrate may be in shape of a plate.

According to some embodiments of the present disclosure, as shown in FIG. 1A, the longitudinal section of the light diverging unit is a trapezoid. In the case that the light diverging unit has the longitudinal section in shape of a trapezoid, a triangle, a semicircle or an arch, light diverging effect can be achieved and the manufacture of the light diverging unit is easy.

According to some embodiments of the present disclosure, a distance between adjacent light diverging units ranges from 10 um to 100 um.

According to the above embodiments, it can be ensured that distances between adjacent light diverging units substantially correspond to distances between adjacent light sources by designing the distances between adjacent light diverging units appropriately.

According to some embodiments of the present disclosure, the substrate is made of a first transparent optical medium material, the light diverging units are made of a second transparent optical medium material, and the first transparent optical medium material may be identical to or different from the second transparent optical medium material.

According to some embodiments of the present disclosure, the substrate is made of a flexible material.

According to some embodiments of the present disclosure, the first transparent optical medium material may include a transparent resin or a transparent glass, and the second transparent optical medium material may include a transparent resin or a transparent glass.

According to some embodiments of the present disclosure, at least one of the first transparent optical medium material and the second transparent optical medium material includes Polyethylene Terephthalate (PET).

According to some embodiments of the present disclosure, the incident light is a collimated light. In the case that the light source emits the collimated light, the light diverging structure provided in the present disclosure can diverge the collimated light, thereby improving light uniformity.

Figure 2:
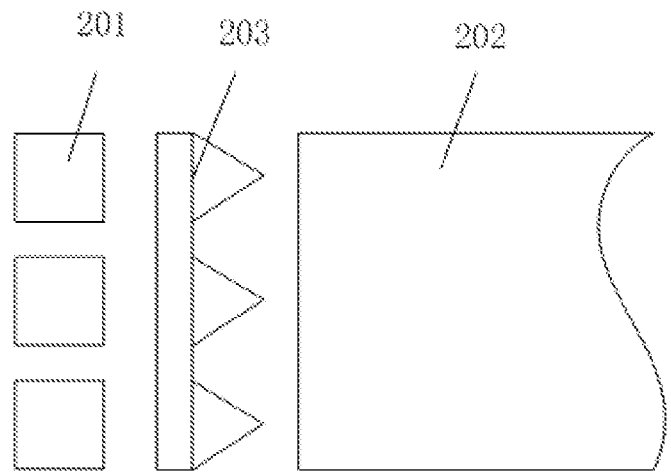
FIG. 2 is a schematic structural diagram of a backlight module according to some embodiments of the present disclosure.

In another aspect, the present disclosure further provides a backlight module. As shown in FIG. 2, the backlight module includes multiple light sources 201, a light guide plate 202, and the light diverging structure 203 according to any of the foregoing embodiments of the present disclosure. The light diverging structure 203 is arranged between a light-entering face of the light guide plate 202 and the multiple light sources 201, and the multiple light diverging units are arranged at a side of the substrate of the light diverging structure, the side being close to the light guide plate.

According to some embodiments of the present disclosure, the multiple light sources are arranged corresponding to the multiple light diverging units in a one-to-one correspondence.

According to some embodiments of the present disclosure, the light guide plate is made of an optical grade flexible silicone.

According to some embodiments of the present disclosure, an incident angle of a light emitted by each light source with respect to the substrate of the light diverging structure is adjustable.

Figure 3A:
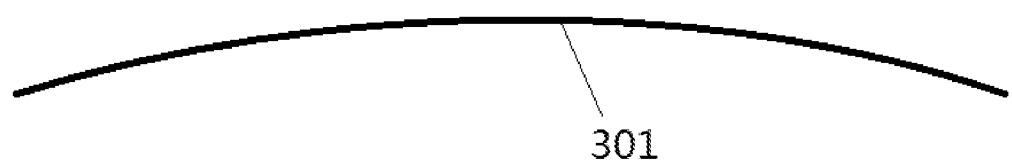
FIG. 3A schematically shows a light band generated by a light diverging structure according to some embodiments of the present disclosure.
Figure 3B:
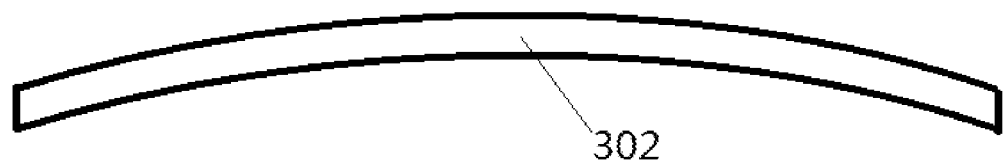
FIG. 3B is a schematic diagram of a light-entering face of a light guide plate according to some embodiments of the present disclosure.

By adjusting the incident angle of the light emitted by each light source with respect to the substrate of the light diverging structure, emergent light from the light diverging structure can form a light band having a certain curvature. As shown in FIG. 2, by adjusting the incident angle of light emitted by each light source 201 with respect to the substrate of the light diverging structure 203, a light band as shown 301 in FIG. 3A can be generated. FIG. 3B shows a shape of the light-entering face 302 of the light guide plate 202. With reference to FIG. 3A and FIG. 3B, in the case that the curvature of the light band 301 is identical to the curvature of the light guide plate 202, the light band 301 can completely enters the light guide plate 202 via the light-entering face, thereby increasing amount of light out of the light guide plate and simplifying light-mixing.

According to some embodiments of the present disclosure, the substrate is a rectangle plate. Each of two short sides of the substrate of the light diverging structure is connected to at least one laminated micrometric displacement element, where each laminated micrometric displacement element can extend or shrink under effect of electric field such that the incident light of light emitted by the light source with respect to the substrate is changed.

According to some embodiments of the present disclosure, the incident light is a collimated light and each light source is a collimated light source. As shown by dotted arrows in FIG. 1A, in the case that the light incident on the light diverging structure is the collimated light, a part of the collimated light may be propagated, reflected or refracted within the light diverging structure, while another part of the collimated light may be emitted out of the light diverging structure and projected onto a receiving face, i.e., the light-entering face of the light guide plate. A curvature radius of the generated light band may vary with the incident angle.

According to some embodiments of the present disclosure, the collimated light source may include a laser diode rod (LD-rod).

According to some embodiments of the present disclosure, the LD-rod may include an LD-rod that emits light having a wavelength ranging from 570 nm to 650 nm, an LD-rod that emits light having a wavelength ranging from 480 nm to 540 nm, and an LD-rod that emits light having a wavelength ranging from 340 nm to 440 nm. The LD-rod that emits light having the wavelength ranging from 570 nm to 650 nm is used to generate a red monochromatic light, the LD-rod that emits light having the wavelength ranging from 480 nm to 540 nm is used to generate a green monochromatic light, and the LD-rod that emits light having the wavelength ranging from 340 nm to 440 nm is used to generate a blue monochromatic light.

By adjusting an incident angle of a light emitted by the laser light source with respect to the substrate of the light diverging structure, a monochromatic light band having a changeable curvature can be generated. As the incident angle of the light emitted by the light source with respect to the substrate of the light diverging structure varies from 0 degree to 90 degrees, a curvature radius of the generated light band varies from positive infinity to 0. Theoretically, a curvature radius of any value can be obtained by adjusting the incident angle. A light band having a curvature of any value can be generated by adjusting the incident angle of the light emitted by the light source with respect to the substrate of the light diverging structure; hence, the backlight module according to the embodiments of the present disclosure can be applied to most of the curved displays.

In practical, a curved display may not have a very large curvature; consequently, the curvature radius of a required light band is adjusted within a relative small range, as long as a relative small range for adjusting the incident angle of the light emitted by the light source with respect to the substrate of the light diverging structure can meet requirements of curvatures of most of the actual curved displays.

According to some embodiments of the present disclosure, a range for adjusting the incident angle of the incident light from each light source with respect to the substrate of the light diverging structure is ±5 degrees or ±10 degrees, that is, an angle between the incident light and a normal vector of the substrate is smaller than or equal to 5 degrees or is smaller than or equal to 10 degrees. In this way, the structure of the backlight module may not be greatly affected and requirements on curvatures of most of the curved displays can be satisfied.

The present disclosure further provides a display device including the backlight module according to any embodiment of the present disclosure.

In view of the above descriptions, the light diverging structure provided in the present disclosure is of easy manufacture and can diverge light emitted by the light source into at least two beams, thereby improving light uniformity and reducing complexity in light-mixing. By properly setting the incident angle of incident light emitted by each light source with respect to the substrate of the light diverging structure, an orientation of the light source can be changed and a curvature of a light band can meet corresponding requirements, thereby improving light-outgoing performance. Furthermore, the backlight module provided in the present disclosure includes the light diverging structure provided in the present disclosure and the curvature of light entering the light guide plate is in accordance with the curvature of the light guide plate, thereby improving the light-outgoing performance of the light guide plate. When applying the backlight module in a curved display using a laser light source, the light-mixing effect can be improved and manufacturing cost and overall size of the curved display can be reduced.

It shall be understood that the embodiments described in the specification are merely intend to explain rather than to limit the present disclosure. The embodiments can be combined and features in the embodiments can be combined in case of no conflict.

Apparently, the ordinary skilled in the art can make various improvements and modifications without departing from the principle and scope of the present disclosure. The present disclosure intends to include all those improvements and modifications if they fall in the scope of appended claims of the present disclosure and equivalent technologies.

What is claimed is:

1. A light diverging structure, comprising:
    a substrate; and
    a plurality of light diverging units arranged on the substrate and spaced from each other,
    wherein the plurality of light diverging units is configured to diverge an incident light into at least two beams of emergent light propagated in different directions, the at least two beams of emergent light propagated in the different directions forming a light band having a preset curvature; and
    wherein the substrate is a rectangle plate, each of two short sides of the substrate of the light diverging structure being connected to at least one laminated micrometric displacement element, wherein each laminated micrometric displacement element extends or shrinks under effect of an electric field.

2. The light diverging structure according to claim 1, wherein each of the plurality of light diverging units comprises at least one bump.

3. The light diverging structure according to claim 2, wherein each of the plurality of light diverging units is one strip-like bump.

4. The light diverging structure according to claim 2, wherein each of the plurality of light diverging units is a strip-like bump formed by a plurality of bump units connected to each other.

5. The light diverging structure according to claim 1, wherein for a longitudinal section of each of the plurality of light diverging units perpendicular to the substrate, a first end of the longitudinal section close to the substrate is wider than a second end of the longitudinal section distant from the substrate.

6. The light diverging structure according to claim 5, wherein the longitudinal section is a trapezoid, a triangle, a semicircle or an arch, and the substrate is in shape of a plate.

7. The light diverging structure according to claim 1, wherein a distance between adjacent light diverging units ranges from 10 um to 100 um.

8. The light diverging structure according to claim 1, wherein the substrate is made of a first transparent optical medium material and the plurality of light diverging units is made of a second transparent optical medium material.

9. The light diverging structure according to claim 8, wherein the first transparent optical medium material comprises a transparent resin or a transparent glass and the second transparent optical medium material comprises a transparent resin or a transparent glass.

10. The light diverging structure according to claim 9, wherein at least one of the first transparent optical medium material and the second transparent optical medium material comprises Polyethylene Terephthalate.

11. The light diverging structure according to claim 1, wherein the incident light is a collimated light.

12. A backlight module, comprising a plurality of light sources, a light guide plate and the light diverging structure according to claim 1;
    wherein the light diverging structure is arranged between a light-entering face of the light guide plate and the plurality of light sources and the plurality of light diverging units is arranged at a side of the substrate of the light diverging structure, the side being close to the light guide plate.

13. The backlight module according to claim 12, wherein the plurality of light sources is arranged corresponding to the plurality of light diverging units in a one-to-one correspondence.

14. The backlight module according to claim 12, wherein an incident angle of a light emitted by each of the plurality of light sources with respect to the substrate of the light diverging structure is adjustable.

15. The backlight module according to claim 12, wherein each of the plurality of light sources is a collimated light source, and the collimated light source is a laser diode rod.

16. The backlight module according to claim 15, wherein the laser diode rod comprises a laser diode rod component that emits a light having a wavelength ranging from 570 nm to 650 nm, a laser diode rod component that emits a light having a wavelength ranging from 480 nm to 540 nm, and a laser diode rod component that emits a light having a wavelength ranging from 340 nm to 440 nm.

17. The backlight module according to claim 12, wherein the light guide plate is made of an optical grade flexible silicone.

18. A display device, comprising a backlight module, wherein the backlight module comprises a plurality of light sources, a light guide plate and a light diverging structure, the light diverging structure comprising a substrate and a plurality of light diverging units arranged on the substrate and spaced from each other;
    wherein the plurality of light diverging units is configured to diverge an incident light into at least two beams of emergent light propagated in different directions, and the at least two beams of emergent light propagated in the different directions forming a light band having a preset curvature;

wherein the substrate is a rectangle plate, each of two short sides of the substrate of the light diverging structure being connected to at least one laminated micrometric displacement element, wherein each laminated micrometric displacement element extends or shrinks under effect of an electric field; and wherein the light diverging structure is arranged between a light-entering face of the light guide plate and the plurality of light sources, and the plurality of light diverging units is arranged at a side of the substrate of the light diverging structure, the side being close to the light guide plate.

* * * * *